US012686739B2

(12) United States Patent
Peng

(10) Patent No.: US 12,686,739 B2
(45) Date of Patent: Jul. 21, 2026

(54) EPOXY-AMINE ADDUCT

(71) Applicant: EVONIK OPERATIONS GMBH, Essen (DE)

(72) Inventor: Qiubai Peng, Shanghai (CN)

(73) Assignee: Evonik Operations GmbH, Essen (DE)

( * ) Notice: Subject to any disclaimer, the term of this patent is extended or adjusted under 35 U.S.C. 154(b) by 671 days.

(21) Appl. No.: 18/014,628

(22) PCT Filed: Jul. 10, 2020

(86) PCT No.: PCT/CN2020/101404
§ 371 (c)(1),
(2) Date: Jan. 5, 2023

(87) PCT Pub. No.: WO2022/006874
PCT Pub. Date: Jan. 13, 2022

(65) Prior Publication Data

US 2023/0257511 A1 Aug. 17, 2023

(51) Int. Cl.
*C08G 59/18* (2006.01)
*C09D 163/00* (2006.01)

(52) U.S. Cl.
CPC .................................. *C08G 59/184* (2013.01)

(58) Field of Classification Search
None
See application file for complete search history.

(56) References Cited

U.S. PATENT DOCUMENTS

| | | | |
|---|---|---|---|
| 8,147,964 B2 | 4/2012 | Vedage et al. | |
| 8,168,296 B2 | 5/2012 | Vedage et al. | |
| 8,518,547 B2 | 8/2013 | Vedage et al. | |
| 2009/0163676 A1 | 6/2009 | Vedage et al. | |
| 2017/0137562 A1* | 5/2017 | Zheng .................... | C08G 59/60 |
| 2017/0247501 A1 | 8/2017 | Zheng et al. | |
| 2019/0352450 A1 | 11/2019 | Spyrou et al. | |
| 2019/0352451 A1 | 11/2019 | Spyrou et al. | |

FOREIGN PATENT DOCUMENTS

| | | | |
|---|---|---|---|
| EP | 3170849 B1 | 8/2019 |
| KR | 1020170066220 A | 6/2017 |
| KR | 1020200008111 A | 1/2020 |
| WO | 2013003202 A1 | 1/2013 |
| WO | 2018/212766 A1 | 11/2018 |

OTHER PUBLICATIONS

PCT International Search Report and the Written Opinion of the international Searching Authority mailed Apr. 9, 2021.

* cited by examiner

*Primary Examiner* — Ha S Nguyen
(74) *Attorney, Agent, or Firm* — Andrew H. Chung; Linda S. Li; Jason S. Ngui

(57) ABSTRACT

Disclosed herein is an epoxy-amine adduct comprising a reaction product of a heterocyclic amine comprising a reaction product of a polyethylene polyamine having 3 to 10 nitrogen atoms and an aldehyde having 1 to 8 carbon atoms; and at least one epoxide having one or more epoxy groups, wherein the heterocyclic amine has at least two nitrogen atoms in at least one ring, and the epoxide is essentially free of polyether modification. A curing agent comprising the epoxy-amine adduct and a method for preparing the epoxy-amine adduct are provided.

16 Claims, No Drawings

EPOXY-AMINE ADDUCT

This Application is a § 371 national stage of PCT International Application No. PCT/CN2020/101404, filed Jul. 10, 2020, the contents of which are hereby incorporated by reference in its entirety into this application.

FIELD

The present disclosure relates to an epoxy-amine adduct, and particularly to an epoxy-amine adduct of a heterocyclic polyamine and epoxy resins.

BACKGROUND

Epoxy-amine curing system is often used in coating. The curing system utilizes a curing agent with amine chemistry and epoxy resins. In applications such as flooring coating, there is growing market need for its improved reactivity and performance at low application temperature, typically below 15° C., more often below 5° C. However, many amine curing agents in the coating suffer from slow cure and poor surface quality caused by defects at such low temperature. Surface defects are often referred to as blushing, carbamation, or water spot marks on the surface.

Primary amines react with atmospheric carbon dioxide and water to form carbamates that can exude to the surface and produce blush. The formation of blush (sometimes called blooming or exudate) has a detrimental effect on coating performance because it can lead to gloss reduction, increased yellowing, poor re-coatability, and inter-coat adhesion problems. Low temperature, high humidity conditions increase the probability of blush formation.

Traditionally, the industry has used accelerators such as tertiary amines, phenols, phenolic derivatives including Mannich base compounds, or salicylic acids to speed up amine-epoxy reaction at low temperature. However, addition of these chemicals should be at low levels since they can cause the epoxy resin to homopolymerize and the resultant system to become brittle. Further, they have a significant impact in causing the final epoxy system to be more prone to yellowing.

Diethylenetriamine (DETA) is well known for usage as a curing agent for epoxy resins in epoxy adhesives and other thermosets, see WO 2013/003202 A1. Recently, as disclosed in EP 3 170 849 B1, through reaction with formaldehyde, DETA is converted to a heterocyclic amine having two nitrogen atoms in the ring. This cyclic amine can significantly improve reactivity of epoxy system at low temperature. However, there are still critical issues at low application temperature such as blushing, slow thin film dry, and very poor water spot resistance. US 2017/0247501 A1 disclosed a waterborne curing composition obtained from the reaction of a polyalkylene polyether modified polyepoxide resin and a polyamine component.

The industry needs curing agents with fast cure, fast dry at low temperature and excellent early water resistance.

SUMMARY

One objective of the present disclosure is to provide an epoxy-amine adduct, which, when used as a curing agent and combined with epoxy resin, can form a coating having fast cure, fast dry at low temperature at 5° C., and excellent early water resistance.

This objective of the present disclosure is achieved by providing an epoxy-amine adduct comprising a reaction product of: a) a heterocyclic amine comprising a reaction product of a polyethylene polyamine having 3 to 10 nitrogen atoms and an aldehyde having 1 to 8 carbon atoms; and b) at least one epoxide having one or more epoxy groups, wherein the heterocyclic amine has at least two nitrogen atoms in at least one ring, and the epoxide is essentially free of polyether modification.

Another objective of the present disclosure is to provide a curing composition comprising epoxy-amine adduct of the present disclosure and a plasticizer.

A further objective of the present disclosure is to provide a method for preparing the epoxy-amine adduct of the present disclosure comprising:

heating a) a heterocyclic amine comprising a reaction product of a polyethylene polyamine having 3 to 10 nitrogen atoms and an aldehyde having 1 to 8 carbon atoms; and b) at least one epoxide having one or more epoxy groups, to a temperature of 120° C. to 280° C. for 0.5 to 10 hours; and wherein the heterocyclic amine has at least two nitrogen atoms in at least one ring, and the epoxide is essentially free of polyether modification.

DETAILED DESCRIPTION

The following description is used merely for illustration but is not to restrict the scope of the present disclosure.

An epoxy-amine adduct used herein is a compound that is formed from a combination of a) one or more amines and b) one or more epoxides. The combination is a chemical reaction, such as an addition reaction. When an excessive amount of polyamine reacts with insufficient epoxy resin and consumes nearly the entirety of the epoxy groups, an epoxy-amine adduct having active hydrogen atoms of the residual amino groups is formed. Since the adduct usually has a high molecular weight, it is less volatile and releases less amine odor. Besides, its reaction with epoxy resin is less exothermic.

Herein, two separate compounds that react to form the epoxy-amine adduct are a heterocyclic amine having at least two nitrogen atoms in at least one ring and at least one epoxide essentially free of polyether modification.

Polyamine

According to one embodiment of the present disclosure, the polyamine includes a heterocyclic amine having at least two nitrogen atoms in the ring as shown in formula (I) or a fused bicyclic heterocyclic amine having three nitrogen atoms according to formula (II):

(I)

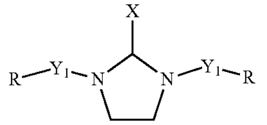

(II)

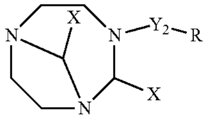

wherein X is independently selected from a hydrogen atom, a linear or branched $C_1$ to $C_4$ alkyl group and a substituted or un-substituted phenyl group, $Y_1$ is a direct bond or a divalent polyethylene polyamine group having 1 to 8 nitrogen atoms or a divalent polyethylene polyamine derivative having 1 to 8 nitrogen atoms, R is independently a hydrogen atom or a group selected from $C_1$ to $C_8$ alkyl, alkenyl, or alkaryl groups, and $Y_2$ is a direct bond or a divalent polyethylene polyamine group having 1 to 7 nitrogen atoms. The $C_1$ to $C_4$ alkyl groups, the polyethylene polyamine groups having 1 to 8 nitrogen atoms, and the polyethylene polyamine groups having 1 to 7 nitrogen atoms may be branched or unbranched. R could preferably be linear, branched, or cyclic.

$Y_1$ and $Y_2$ preferably are divalent polyethylene polyamine groups that include repeating units that may be linear or branched. Suitable repeating divalent polyethylene polyamine group units include the following formula (III):

(III)

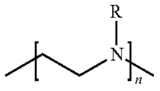

wherein R is independently a hydrogen atom, or a group selected from $C_1$-$C_8$ alkyl, alkenyl, or alkaryl groups, and R from two consecutive repeating units can form a 5-member or 6-member ring with the backbone ethylene unit, and n=1 to 8 for $Y_1$ or n=1 to 7 for $Y_2$. R could preferably be linear, branched, or cyclic.

Preferably, the heterocyclic polyamine includes simultaneously a heterocyclic amine having at least two nitrogen atoms in the ring as shown in formula (I) and a fused bicyclic heterocyclic amine having three nitrogen atoms according to formula (II) as shown in the above diagrams.

Preferable examples for X include hydrogen atom, methyl, ethyl, isopropyl, n-propyl, phenyl, iso-butyl, and n-butyl group. More preferable examples of X include hydrogen atom, methyl, and phenyl group. A most preferable example of X is hydrogen atom. Preferable examples of R include hydrogen atom, methyl, ethyl, isopropyl, n-propyl, iso-butyl, n-butyl, 3-methylbutyl, and cyclohexyl group. More preferable examples of R include hydrogen atom, methyl, ethyl, isopropyl, iso-butyl, and 3-methylbutyl group. The most preferable examples of R are hydrogen atom, methyl, ethyl, and isopropyl group.

The heterocyclic amine or the fused bicyclic heterocyclic amine can be prepared by reacting linear or branched polyethylene polyamine having 3 to 10 nitrogen atoms with a $C_1$ to $C_8$ aldehyde. The protocol of the synthesis is elaborated in European patent EP 3 170 849 B1.

Polyethylene Polyamine

Linear or branched polyethylene polyamine has a generic formula according to formula (IV):

(IV)

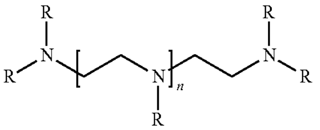

wherein R is independently a hydrogen atom, or a group selected from $C_1$-$C_8$ alkyl, alkenyl, or alkaryl groups; n is an integer from 1 to 8. R could preferably be linear, branched, or cyclic.

Preferable polyethylene polyamines having 3 to 10 nitrogen atoms according to the present disclosure include, but are not limited to, diethylenetriamine (DETA), triethylenetetramine (TETA), tetraethylenepentamine (TEPA), pentaethylenehexamine (PEHA), and mixtures thereof. More preferable polyethylene polyamines having 3 to 10 nitrogen atoms include DETA, TETA, TEPA, and PEHA. Still more preferable polyethylene polyamines are DETA and TETA. Further still preferable polyethylene polyamine is DETA. Suitable structures for the linear and branched polyethylene polyamine compounds include, but are not limited to the following formulas:

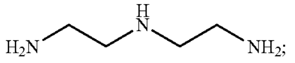

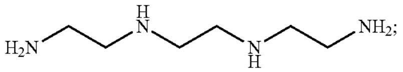

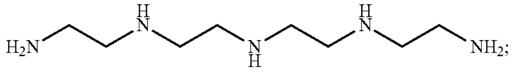

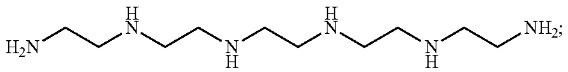

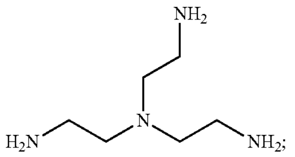

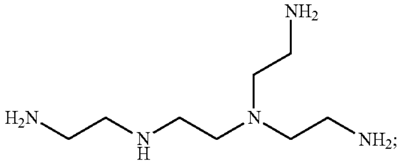

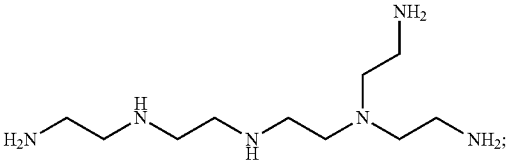 and

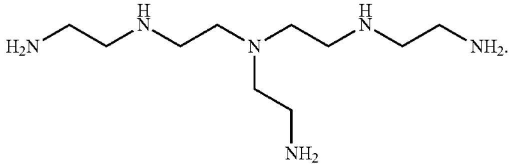

The polyethylene polyamine compounds having 3 to 10 nitrogen atoms be used individually or mixed with one another. It is to be understood that commonly available polyethylene polyamine compounds having 3 to 10 nitrogen atoms such as TETA, TEPA, and PEHA are mixtures of linear and branched isomers and other congeners having cyclic structures. Some of the linear and branched isomers are shown above, these commonly available polyethylene polyamine compounds are included in the definition of polyethylene polyamine compounds of the present disclosure.

According to some embodiments, the polyethylene polyamine compounds having 3 to 10 nitrogen atoms are preferably substituted with alkyl groups. Examples include alkylated polyethylene polyamine as disclosed in U.S. Pat. No. 8,518,547 and benzylated polyethylene polyamine as disclosed in U.S. Pat. Nos. 8,147,964 and 8,168,296. The above referenced patents are hereby incorporated by reference.

Aldehyde

The $C_1$ to $C_8$ aldehyde compounds that are useful in producing the heterocyclic polyamine include but are not limited to, formaldehyde, acetaldehyde, propionaldehyde, and butraldehyde, isobutyraldehyde, trimethylacetaldehyde, 2-methylbutyraldehyde, isovaleraldehyde, valeraldehyde, hexanal, phenylacetaldehyde, benzaldehyde, vanillic aldehyde (also known as vanilline), o-tolualdehyde, o-anisaldehyde, salicylaldehyde and 4-hydroxylbenzaldehyde. Suitable examples of $C_1$ to $C_8$ aldehyde compounds include formaldehyde, acetaldehyde, benzaldehyde, tolualdehyde, o-anisaldehyde, and salicylaldehyde. Other examples of $C_1$ to $C_8$ aldehyde compounds include formaldehyde, and benzaldehyde, and particularly suitable example is formaldehyde. When formaldehyde is used as the $C_1$ to $C_8$ aldehyde compound, it is typically used as an aqueous solution with some methanol as stabilizer for easy handling. For easy handling, the trimer of formaldehyde, 1,3,5-trioxane, and the oligomer and polymer form, paraformaldehyde are used as equivalent to formaldehyde aqueous solution since both are solid. In the present disclosure, paraformaldehyde is used as equivalent to formaldehyde.

Besides the heterocyclic amine, the polyamine component can comprise at least one multifunctional amine. Multifunctional amine, as used herein, describes compounds with amine functionality and which contain two (2) or more active amine hydrogens.

Non-limiting examples of multifunctional amines that are within the scope of the present disclosure include, but are not limited to, an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, and the like, or any combination thereof.

Preferably, more than one multifunctional amine is used in the compositions of the present disclosure. For example, the at least one multifunctional amine comprises an aliphatic amine and a Mannich base derivative of a cycloaliphatic amine. Also, the at least one multifunctional amine comprises one aliphatic amine and one different aliphatic amine.

Exemplary aliphatic amines include polyethyleneamines (ethylene diamine or EDA, diethylene triamine or DETA, triethylenetetraamine or TETA, tetraethylenepentamine or TEPA, pentaethylenehexamine or PEHA, and the like), polypropyleneamines, aminopropylated ethylenediamines, aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine (commercially available as Dytek-A), and the like, or combinations thereof. Additionally, the poly(alkylene oxide) diamines and triamines commercially available under the Jeffamine name from Huntsman Corporation, are useful in the present disclosure. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine (IPDA), various isomers or norbornane diamine, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic) amines, and the like, or combinations thereof. The mixture of methylene bridged poly(cyclohexyl-aromatic)amines is abbreviated as either MBPCAA or MPCA, and is described in U.S. Pat. No. 5,280,091, which is incorporated herein by reference in its entirety. In one aspect of the present disclosure, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present disclosure is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® K54 from Evonik Operations GmbH) or bis-dimethylaminomethylphenol.

Polyamide derivatives can be prepared by the reaction of an aliphatic amine, cycloaliphatic amine, or aromatic amine with a dimer fatty acid, or mixtures of a dimer fatty acid and a fatty acid. Amidoamine derivatives can be prepared by the reaction of an aliphatic amine, cycloaliphatic amine, or aromatic amine with fatty acids.

Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

In another aspect of the present disclosure, the curing agent includes a co-curing agent. The co-curing agent may be an amidoamine curing agent, an aliphatic curing agent, a polyamide curing agent, a cycloaliphatic curing agent, or a Mannich base curing agent which also includes phenalkamine.

Epoxide

According to the present disclosure, the epoxide is essentially free of polyether modification. Preferably the epoxide includes at least one monofunctional or multifunctional epoxide.

The at least one monofunctional epoxide includes one or more epoxides or epoxy resins having one epoxy group per molecule. The at least one multifunctional epoxide includes, but is not limited to, epoxides having two, three, four, or at least five epoxy groups per molecule.

Useful compounds are a multitude of those known for this purpose that contain more than one epoxy group, preferably two epoxy groups, per molecule. These epoxy compounds are preferably either saturated or unsaturated. They are preferably aliphatic, cycloaliphatic, aromatic or heterocyclic, and have hydroxyl groups. They preferably contain such substituents that do not cause any side reactions under the mixing or reaction conditions, for example alkyl or aryl substituents, ether moieties and the like. They are preferably glycidyl ethers which derive from polyhydric phenols, especially bisphenols and novolac, and which have molar masses based on the number of epoxy groups ME (EEW, "epoxy equivalent weights", "EV value") between 100 and 1500 g/eq, but especially between 150 and 250 g/eq.

Examples of polyhydric phenols include: resorcinol, hydroquinone, 2,2-bis(4-hydroxyphenyl)propane (bisphenol A), bis(4-glycidyloxyphenyl)methane (bisphenol E), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxy equivalent weight of 150 to 200 g/eq. It is also possible to use polyglycidyl ethers of polyols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components A) include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

The monofunctional epoxide includes, but is not limited to, an epoxidized unsaturated hydrocarbon such as ethylene, propylene, butylene, cyclohexene, and styrene oxides, and the like; halogen-containing epoxides such as epichlorohydrin; epoxyethers of monohydric alcohols such as methyl, ethyl, butyl, 2-ethylhexyl, dodecyl alcohol, and the like; epoxy-ethers of monohydric phenols such as phenol, cresol, and other phenols substituted in the ortho or para positions; glycidyl esters of unsaturated carboxylic acids; epoxidized esters of unsaturated alcohols or unsaturated carboxylic acids; acetals of glycidaldehyde; or combination thereof. Preferably, the monofunctional glycidyl ether includes o-cresyl glycidyl ether, phenyl glycidyl ether, p-tert-butylphenyl glycidyl ether, n-butyl glycidyl ether, 2-ethyl hexyl glycidyl ether, any alkyl $C_8$ to $C_{14}$ glycidyl ether, or any combination thereof.

The multifunctional epoxide includes, but is not limited to a bisphenol A diglycidyl ether, bisphenol E diglycidyl ether, bisphenol F diglycidyl ether, 1,4-butanediol diglycidyl ether, cyclohexane dimethylol diglycidyl ether, resorcinol diglycidyl ether, glycerol triglycidyl ether, trimethylol propane triglycidyl ether, novolacs epoxy resin, any other aliphatic diglycidyl or triglycidyl ether, any other cycloaliphatic diglycidyl or triglycidyl ether, or any combination thereof. Preferably, the multifunctional epoxide is a bisphenol A epoxy resin, a bisphenol E diglycidyl ether, a bisphenol F epoxy resin, 1,4-butanediol diglycidyl ether, cyclohexane dimethylol diglycidyl ether, resorcinol diglycidyl ether, glycerol triglycidyl ether, trimethylol propane triglycidyl ether, or novolac epoxy resin, or a combination thereof.

The epoxide preferably has no alkoxylate repeating units. The alkoxylate repeating units have a formula as:

(V)

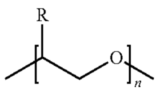

where n is an integer not less than 1, and R refers to a monovalent radical, including hydrogen, methyl, ethyl, or any other alkyl. The alkoxylate repeating units include, but are not limited to, ethoxylate, propoxylate, butoxylate, or any other alkoxylate.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30% by weight, preferably 10% to 20% by weight, based on the mass of the polyglycidyl ethers.

Useful epoxy compounds preferably include glycidyl ethers and glycidyl esters, aliphatic epoxides, diglycidyl ethers based on bisphenol A, bisphenol E and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of versatic acid (trade name: CARDURA E10, Shell), 3,4-epoxycyclohexylmethyl 3,4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups. It is also possible to use mixtures of the epoxy compounds mentioned.

Particularly preferred epoxy components are polyepoxides based on bisphenol A diglycidyl ether, bisphenol E diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate.

According to the present disclosure, it is also possible with preference to use mixtures of these epoxy compounds in the epoxy resin.

The epoxy resin may be in various forms, such as, a crystalline form, a powdered form, a semi-solid form, a liquid form, etc. For the liquid form, the epoxy resin may be dissolved in a solvent, for example, water. Preferably, the epoxy resin is in a liquid form, to facilitate the mixing process.

The epoxides are commercially available from various chemical manufacturers, for example, D.E.R.™ 331, 332, 337, 351, or 731 from Olin Corporation, Epodil® 742, 746, 747, 748, 750, 733, 762 from Evonik Resource Efficiency GmbH. Several epoxy compounds are also described, for example, in EP 675 185 A1.

Synthesis of Adduct

The addition reaction to synthesize the epoxy-amine adduct according to the present disclosure comprises contacting the heterocyclic amine with the epoxide, preferably with presence of a plasticizer. Details of the plasticizer will be discussed hereinafter.

Preferably, the reaction of heterocyclic amine with the epoxide proceeds at a reaction temperature of about 50° C. to about 150° C., more preferably about 60° C. to about 140° C., still more preferably about 70° C. to about 100° C. The elevated temperature ensures a fast and thorough adduction reaction. The heating condition endures for 0.5 to 10 hours, preferably 1 to 5 hours. Preferably, the heating condition is accompanied by a rigorous stirring, for example, under 100 RPM, 150 RPM, or 200 RPM stirring.

The reaction is preferably conducted under a protective atmosphere, more preferably in a nitrogen or argon atmosphere, partly to keep amine from oxidation or other threats.

The synthesis is preferably conducted with presence of a solvent or plasticizer. Preferred solvent or plasticizer for the reaction includes but is not limited to, water, acetonitrile, alcohol such as methanol, ethanol, n-propanol, isopropanol, n-butanol, Dowanol™ PM, t-butanol, isobutanol, and benzyl alcohol, and hydrocarbons such as toluene, xylene, hexane, and heptane. More preferred reaction solvent or plasticizer includes water, methanol, ethanol, n-propanol, i-propanol, n-butanol, Dowanol™ PM, or benzyl alcohol. The solvent is preferably removed after the reaction is complete or remain mixed with the adduct. For example, after the reaction of epoxide and amine, benzyl alcohol remains as plasticizer.

Stoichiometric Ratio

Herein, stoichiometric ratio is calculated as a ratio of an equivalent number of active amine hydrogens of the heterocyclic polyamine to an equivalent number of epoxy groups in the epoxides. It can be calculated according to the following equation:

$$SR = \frac{n_a}{n_e} = \frac{M_a}{AHEW}\frac{EEW}{M_e}$$

Wherein SR is the calculated stoichiometric ratio, $n_a$ is the number of amine hydrogen atoms, $n_e$ is the number of epoxy groups, $M_a$ is the mass weight of heterocyclic polyamine, and $M_e$ is the mass weight of epoxide. ANEW is amine hydrogen equivalent weight in g/mol. Epoxy group content, indicated by epoxide equivalent weight or EEW, is the ratio between the molecular weight of the monomer and the number of epoxy groups.

To prepare the epoxy-amine adduct according to the present disclosure, a stoichiometric ratio is preferably in a range of 3-100, more preferably in a range of 4-40, more preferably in a range of 5-15.

This stoichiometry causes the epoxy-amine adduct to possess a number of unreacted hydrogen atoms bonded to nitrogen atoms, reducing the reactivity of adduct when being mixed with epoxy resin. When the stoichiometric ratio of epoxide to heterocyclic amine is too low, e.g., less than 0.005, the resultant epoxy-amine adduct will suffer from a low molecular weight and a number of primary amino groups in the heterocyclic amine would be left. The resultant adduct might have a high reactivity towards epoxy resins, causing a low surface quality of the final coating. When the stoichiometric ratio of epoxide to heterocyclic amine is too high, e.g., more than 0.40, there might be a high degree of crosslinking and the molecular weight of adduct might become very high. The adduct may suffer from high viscosity caused by high level of crosslinking and thus would be unsuitable for usage as a curing agent.

Curing Agent

The present disclosure further provides a curing agent including the epoxy-amine adduct. The curing agent is used for curing epoxy resins to form coating, adhesives, sealants, and so on. The curing agent includes, besides the epoxy-amine adduct, one or more plasticizers.

In some aspects of the present disclosure, a plasticizer is added to the epoxy-amine adduct to form a curing agent. Preferably, the plasticizer is selected from the group consisting of aromatics, aliphatics, esters, ketones, ethers, alcohols, glycols, glycol ethers, and the like, and mixtures thereof. More preferably, ketones such as acetone, methyl ethyl ketone, methyl isoamyl ketone, methyl propyl ketone, methyl amyl ketone, diacetone alcohol, and the like, are used as a plasticizer, often resulting in improved pot life with little or no sacrifice in drying speed. If ester plasticizers are included in the composition or formulation, such as esters of phthalic acid, it is usually necessary to formulate them in the package containing the epoxy resin, to minimize their reaction with the amine curing agent. Other preferred plasticizers include, but are not limited to, benzyl alcohol, n-butanol, iso-propanol, toluene, xylene, nonyl phenol, dodecyl phenol, t-butyl phenol, bisphenol-A, cresol, cashew nutshell liquid, propylene glycol monomethyl ether (often abbreviated as PM), or aliphatic and/or aromatic hydrocarbon solvents such as those commercially available under the trademark name Shellsol. Mixtures of combinations of more than one plasticizer or solvent are used. Preferably, the at least one plasticizer employed in the epoxy-amine adduct of the present disclosure comprises benzyl alcohol, n-butanol, xylene, methyl ethyl ketone, nonyl phenol, dodecyl phenol, cardanol, an ester of phthalic acid, or combinations thereof.

Epoxy Resin in Coating Composition

The curing agent of the present disclosure is used with epoxy resins already known in the art, to form a coating composition. Preferably, the epoxy resins are the same with or different from the epoxide used in synthesis of epoxy-amine adduct.

Useful compounds are a multitude of those known for this purpose that contain more than one epoxy group, preferably two epoxy groups, per molecule. These epoxy compounds are preferably either saturated or unsaturated. They are preferably aliphatic, cycloaliphatic, aromatic or heterocyclic, and have hydroxyl groups. They preferably contain such substituents that do not cause any side reactions under the mixing or reaction conditions, for example alkyl or aryl substituents, ether moieties and the like. They are preferably glycidyl ethers which derive from polyhydric phenols, especially bisphenols and novolac, and which have molar masses based on the number of epoxy groups ME ("epoxy equivalent weights", "EV value") between 100 and 1500 g/eq, but especially between 150 and 250 g/eq.

Examples of polyhydric phenols include: resorcinol, hydroquinone, 2,2-bis(4-hydroxyphenyl)propane (bisphenol A), bis(4-glycidyloxyphenyl)methane (bisphenol E), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis (4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis (4-hydroxyphenyl) ether, bis(4-hydroxyphenyl) sulphone inter alia, and the chlorination and bromination products of the aforementioned compounds, for example tetrabromobisphenol A. Very particular preference is given to using liquid diglycidyl ethers based on bisphenol A and bisphenol F having an epoxy equivalent weight of 150 to 200 g/eq. It is also possible to use polyglycidyl ethers of polyols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Further useful components A) include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. The poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention should additionally be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30% by weight, preferably 10% to 20% by weight, based on the mass of the polyglycidyl ethers.

Useful epoxy compounds preferably include glycidyl ethers and glycidyl esters, aliphatic epoxides, diglycidyl ethers based on bisphenol A, bisphenol E and/or bisphenol F, and glycidyl methacrylates. Other examples of such epoxides are triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of versatic acid (trade name: CARDURA E10, Shell), 3,4-epoxycyclohexylmethyl 3,4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups. It is also possible to use mixtures of the epoxy compounds mentioned.

Particularly preferred epoxy components are polyepoxides based on bisphenol A diglycidyl ether, bisphenol E diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate.

According to the present disclosure, it is also possible with preference to use mixtures of these epoxy compounds in the epoxy resin.

The epoxy resin may be in various forms, such as, a crystalline form, a powdered form, a semi-solid form, a liquid form, etc. For the liquid form, the epoxy resin may be dissolved in a solvent, for example, water. Preferably, the epoxy resin is in a liquid form, to facilitate the mixing process.

Coating Composition

The present disclosure further provides a coating composition comprising the epoxy-amine adduct and at least one epoxy resin.

To bring in more functionality or features to satisfy industrial requirements, the coating composition preferably includes additives. Additives are understood to mean substances which are added to alter the properties of the coating composition in the desired direction, for example to match viscosity, wetting characteristics, stability, reaction rate, blister formation, storability or adhesion, and use properties, to the end application. Several additives are described, for example, in WO 99/55772, pp. 15-25.

Preferred additives are selected from the group consisting of fillers, reinforcing agents, coupling agents, toughening agents, defoamers, dispersants, lubricants, colorants, marking materials, dyes, pigments, IR absorbers, antistats, antiblocking agents, nucleating agents, crystallization accelerators, crystallization delayers, conductivity additives, carbon black, graphite, carbon nanotubes, graphene, desiccants, de-molding agents, levelling auxiliaries, flame retardants, separating agents, optical lighteners, rheology additives, photochromic additives, softeners, adhesion promoters, antidripping agents, metallic pigments, stabilizers, metal glitters, metal coated particles, porosity inducers, glass fibers, nanoparticles, flow assistants, or combinations thereof.

The additive preferably constitutes a proportion of not greater than 90 wt. %, preferably not greater than 70 wt. %, more preferably not greater than 50 wt. %, still more preferably not greater than 30 wt. %, with respect to the total weight of coating composition.

For example, it is advantageous to add light stabilizers, for example sterically hindered amines, or other auxiliaries as described, for example, in a total amount of 0.05 wt. % to 5 wt.

To produce the curing compositions of the present disclosure, it is additionally possible to add additives such as levelling agents, for example polysilicones, or adhesion promoters, for example those based on acrylate. In addition, still further components may optionally be present. Auxiliaries and additives used in addition may be chain transfer agents, plasticizers, stabilizers and/or inhibitors.

In some cases, the coating composition preferably includes an antioxidant additive. The antioxidant might include one or more of the structural units selected from sterically hindered phenols, sulfides, or benzoates. Here, in sterically hindered phenols, the two orthohydrogens are substituted by compounds which are not hydrogen and preferably carry at least 1 to 20, particularly preferably 3 to 15, carbon atoms and are preferably branched. Benzoates also carry, preferably in the ortho position relative to the OH group, substituents which are not hydrogen and carry particularly preferably 1 to 20, more preferably, 3 to 15, carbon atoms, which are preferably branched.

In still another embodiment, if needed, one or more catalysts are preferably introduced to the coating composition, preferably as a part of the coating composition, to promote the reaction of the epoxy groups of epoxy resins and amine groups of the coating composition. Useful catalysts that may be introduced to the adhesive composition include Ancamide® products available from Evonik Resource Efficiency GmbH and products marketed as "Accelerators" available from the Huntsman Corporation. One exemplary catalyst is piperazine-base Accelerator 399 available from the Huntsman Corporation. When utilized, such catalysts preferably comprise between 0 wt. % and about 10 wt. % of the total adhesive composition.

Preferably, the coating composition according to the present disclosure consists of the above specified components.

The present disclosure also is directed to articles of manufacture comprising the compositions disclosed herein. For example, an article can comprise a coating composition which comprises the reaction product of an epoxy-amine adduct and an epoxy composition. Articles of manufacture produced from coating compositions disclosed herein include, but are not limited to, adhesives, coatings, primers, sealants, curing compounds, construction products, flooring products, and composite products. Further, such coatings, primers, sealants, or curing compounds can be applied to metal or cementitious substrates. Coatings based on these coating compositions can be solvent-free or can contain diluents, such as water or organic solvents, as needed for the particular application. Coatings can contain various types and levels of pigments for use in paint and primer applications. Coating compositions comprise a layer having a thickness ranging from 40 to 400 μm (micrometer), preferably 80 to 300 μm, more preferably 100 to 250 μm, for use in a protective coating applied on to metal substrates. In addition, for use in a flooring product or a construction product, coating compositions comprise a layer having a thickness ranging from 50 to 10,000 μm, depending on the type of product and the required end-properties. A coating product that delivers limited mechanical and chemical resistances comprises a layer having a thickness ranging from 50 to 500 μm, preferably 100 to 300 μm; whereas a coating product such as, for example, a self-levelling floor that delivers high mechanical and chemical resistances comprises a layer having a thickness ranging from 1,000 to 10,000 μm, preferably 1,500 to 5,000 μm.

Numerous substrates are suitable for the application of coatings of the present disclosure with proper surface preparation, as is well known to one of ordinary skill in the art. Such substrates include, but are not limited to, concrete and various types of metals and alloys, such as steel and aluminium. Coatings of the present disclosure are suitable for the painting or coating of large metal objects or cementitious substrates including ships, bridges, industrial plants and equipment, and floors.

Coatings of the present disclosure can be applied by any number of techniques including spray, brush, roller, paint mitt, and the like. In order to apply very high solids content or 100% solids coatings of the present disclosure, plural component spray application equipment can be used, in which the amine and epoxy components are mixed in the lines leading to the spray gun, in the spray gun itself, or by mixing the two components together as they leave the spray gun. Using this technique can alleviate limitations regarding the pot life of the formulation, which typically decreases as both the amine reactivity and the solids content increases. Heated plural component equipment can be employed to reduce the viscosity of the components, thereby improving ease of application.

Construction and flooring applications include compositions comprising the coating compositions of the present disclosure in combination with concrete or other materials commonly used in the construction industry. Applications of compositions of the present disclosure include, but are not limited to composition's use as a primer, a deep penetrating primer, a coating, a curing compound, and/or a sealant for new or old concrete, such as referenced in ASTM C309-97, which is incorporated herein by reference. As a primer or a sealant, the coating compositions of the present disclosure can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Coating compositions of the present disclosure can be mixed with cementitious materials such as concrete mix to form polymer or modified cements, tile grouts, and the like. Non-limiting examples of composite products or articles comprising coating compositions disclosed herein include tennis rackets, skis, bike frames, airplane wings, glass fiber reinforced composites, and other molded products.

In a particular use of the present disclosure these curing agent compositions will have applicability in making epoxy filament-wound tanks, infusion composites such as windmill blades, aerospace adhesives, industrial adhesives, as well as other related applications. A composite is a material made of different substances, and in the case of resin technologies, composites refer to resin impregnated systems where the resin is reinforced by the addition of reinforcing materials such as fillers and fibers for improving general properties of the resulting product. These materials work together but are not soluble in one another. In the present case, the binder component comprises the epoxy resin and epoxy curing agent(s). There are many types of composite applications such as prepregs, laminates, filament windings, braiding, pultrusion, wet lay and infusion composites. Resin infusion, or resin transfer, is a process by which resin is introduced to the composite mold, the reinforcement material having already been placed into the mold and closed prior to resin introduction. There are variations on this process such as those that are vacuum assisted or transfer resin under (high) pressure.

The uses of epoxy resins which are cured, hardened, and/or crosslinked with amine-based curing agents are well known. These coating materials are widely used in applications ranging from coatings, where they can be used in various applications such as primers, tie-coats, and finishes. They can be applied on many substrates. They can be used in laminates, adhesives, floorings, dust free finishes, secondary containment, linings, reinforcement, repair formulations, tooling, potting, and casting. They can be used in many industries like building (food manufacture, bridges, sewage plants), automotive, marine applications (ship painting, buoy painting, shipping containers), aeronautic (gluing of parts, honeycomb reinforcement for cabin structure, re-entry shield for satellites), electronic (printed circuit base, potting of electronic components, wire insulation), sports (tennis rackets, golf clubs, canoes, skis) and many mores applications such as filament winding for containers and tanks, laminates for wind energy and propellers for planes, syntactic foams and many other applications which are well known to those skilled in the art.

The present disclosure also includes articles of manufacture comprising a coating composition as described above. Such articles can include, but are not limited to, an adhesive, a coating, a primer, a sealant, a curing compound, a construction product, a flooring product, a composite product, laminate, potting compounds, grouts, fillers, cementitious grouts, or self-levelling flooring. Additional components or additives can be used together with the compositions of the present disclosure to produce articles of manufacture. Further, such coatings, primers, sealants, curing compounds or grouts can be applied to metal or cementitious substrates.

The present disclosure is illustrated by way of example and comparative examples hereinbelow.

EXAMPLES

In the following examples, the materials or definitions used are listed as below. D.E.R.™ 331 is diglycidyl ether of bisphenol A, from Olin Corporation, a liquid reaction product of epichlorohydrin and bisphenol A. D.E.R.™ 331 has an EEW of 182-192 g/mol.

Epodil® 742 is o-cresyl glycidyl ether from Evonik Specialty Chemicals. It is a monofunctional reactive diluent used to reduce the viscosity of epoxy resin systems. Epodil® 742 has an EEW of 167-195 g/mol.

Epodil® 748 is the glycidyl ether of a mixture of $C_{12}$ to $C_{14}$ aliphatic alcohols used to reduce the viscosity of epoxy resin systems. It is a monofunctional reactive diluent, which provides excellent viscosity reduction. Epodil® 742 has an EEW of 275-300 g/mol.

Benzyl alcohol commercially available from Fisher Scientific UK Ltd. is an aryl alcohol, used as a plasticizer.

Amine hydrogen equivalent weight in g/mol, or AHEW, is calculated as molecular weight of the amine as a curing agent divided by the number of active hydrogen atoms per molecule.

Epoxy group content, indicated by epoxide equivalent weight or EEW, is the ratio between the molecular weight of the epoxide and the number of epoxy groups.

Stoichiometric ratio is calculated as calculated as a ratio of an equivalent number of active amine hydrogens of the heterocyclic polyamine to an equivalent number of epoxy groups in the epoxides. It can be calculated according to the following equation:

$$SR = \frac{n_a}{n_e} = \frac{M_a}{AHEW}\frac{EEW}{M_e}$$

SR is the calculated stoichiometric ratio, $n_a$ is the number of amine hydrogen atoms, $n_e$ is the number of epoxy groups, $M_a$ is the mass weight of heterocyclic polyamine, and $M_e$ is the mass weight of epoxide.

Hardener use level is dosage of curing agent per hundred resin. In the synthesis examples it is calculated as amount of epoxy-amine adducts per diluted epoxy resin having an EEW of 195 g/mol.

The following protocols to test physical performance or properties of sample are used:

Viscosity was measured by a Brookfield DV-II+Pro viscometer at 25° C. Tensile strength and elongation were measured according to ISO 527-2. Glass transition temperature was tested using DSC according to ASTM E1356-08.

Drying time was tested on a BY drying recorder according to ASTM D5895. Stage 1 is also known as "set-to-touch time". Stage 2 is for "tack-free time". Stage 3 is for "dry-hard time". Stage 4 refers to "dry-through time".

Hardness was tested with Shore D tester according to China national standard GB/T2411.

Water spot resistance, or so-called "carbamation resistance" or "blushing resistance", was measured according to a test method described as following. After curing for a certain period, for example, 1 or 2 days, a water-saturated cotton ball was placed on the coating surface then was covered by water glass. The next day, coating surface appearance after removing the cotton ball is evaluated visually by ranking from the numerals 1 to 5 as indicated in Table 1.

TABLE 1

| Rank | Level | Description |
|---|---|---|
| 1 | Very bad | White surface |
| 2 | Bad | Slight whitening |
| 3 | Moderate | Hazy surface |
| 4 | Good | Visible contours |
| 5 | Very good | Glossy surface |

For flooring application, a stage 3 lasting for less than 16 hours is preferred and a stage 4 lasting for less than 24 hours is more preferred. Usually, a coating with shore D hardness above 50 allows light traffic and people to walk on. Ultimate Shore D hardness high than 75 is preferred. Ranking 3 of water spot resistance is minimum requirement for flooring coating surface. Ranking 4 for 1d water spot resistance is high preferred.

Synthesis of Heterocyclic Polyamine

Diethylenetriamine (DETA, 650 g) was charged to a reactor equipped with a nitrogen inlet, a condenser, an addition funnel, and an overhead stirrer. To DETA was added formaldehyde aqueous solution (818.1 g) via an addition funnel to maintain a temperature below 60° C. After the addition, the reaction was kept at 60° C. for 30 minutes. Water was then removed under reduced pressure. The product was obtained as a clear liquid in quantitative yield with an amine value of 873 mEq KOH/g and a viscosity of 8,900 mPa·s at 25° C. Calculated amine hydrogen equivalent weight is 68 g/eq. NMR analysis showed that 39 mol. % of DETA formed 1-(2-aminoethyl)imidazolidine, which corresponds to 37 wt. % to the total weight in the product by calculation.

For sake of convenience, the heterocyclic polyamine as synthesized is named as "PA1" hereinafter.

Synthesis of Epoxy-Amine Adduct

A sample of the comparative synthesis example (CSE) was prepared by mixing benzyl alcohol with PA1 at room temperature, without addition of epoxide.

Samples of synthesis examples SE 1 through SE 13 were synthesized according to a protocol as described below. Weights of reactants, total weights, amine hydrogen equivalent weights, and stoichiometric ratios for CSE and SE 1 through SE 13 are given in Tables 2 and 3.

First, PA1 was dissolved in benzyl alcohol and heated to 80° C. with the presence of $N_2$ atmosphere. Then to the solution was slowly added epoxy resin D.E.R.™ 331 or Epodil® 742. The mixture was stirred at 80° C. to 85° C. for 1 hour. The resultant was cooled down to 50° C. and discharged.

TABLE 2

| | CSE | SE 1 | SE 2 | SE 3 | SE 4 | SE 5 | SE 6 |
|---|---|---|---|---|---|---|---|
| Benzyl alcohol (parts) | 30.0 | 30.0 | 30.0 | 30.0 | 30.0 | 30.0 | 30.0 |
| PA1 (parts) | 70.0 | 70.0 | 70.0 | 70.0 | 70.0 | 70.0 | 70.0 |
| D.E.R. ™ 331 (parts) | 0 | 3.5 | 7.0 | 14.0 | 21.0 | 24.5 | 28.0 |
| Total (parts) | 100 | 103.5 | 107 | 114 | 121 | 124.5 | 128 |
| AHEW (g/mol) | 97.1 | 102.4 | 107.9 | 119.4 | 131.9 | 138.6 | 145.5 |
| Stoichiometric ratio | — | 55.0 | 27.5 | 13.8 | 9.2 | 7.9 | 6.9 |

TABLE 3

| | SE 7 | SE 8 | SE 9 | SE 10 | SE 11 | SE 12 | SE 13 |
|---|---|---|---|---|---|---|---|
| Benzyl alcohol (parts) | 30.0 | 30.0 | 30.0 | 30.0 | 30.0 | 30.0 | 30.0 |
| PA1 (parts) | 70.0 | 70.0 | 70.0 | 70.0 | 70.0 | 70.0 | 70.0 |
| Epodil ® 742 (parts) | 3.5 | 7.0 | 14.0 | 21.0 | 28.0 | 31.5 | 35.0 |
| Total (parts) | 103.5 | 107.0 | 114.0 | 121.0 | 128.0 | 131.5 | 135 |
| AHEW (g/mol) | 102.5 | 108.0 | 119.7 | 132.4 | 146.2 | 153.6 | 161.3 |
| Stoichiometric ratio | 53.5 | 26.8 | 13.4 | 8.9 | 6.7 | 5.9 | 5.4 |

Preparation and Performance of Testing Sample

Samples in testing examples (TE 1 through TE 13) and a comparative testing example (CTE) were prepared by formulating products (adducts or mixture) obtained in the corresponding synthesis examples (SE 1 through SE 13 and CSE) with an EEW of 195 g/mol for performance test. The diluent resin is a resin blend of D.E.R.™ 331 and Epodil® 748 at ratio of 90 to 10 by weight. Use level of the epoxy-amine adducts to the diluted resins are according to hardener use level (phr). All samples were conditioned at 5° C. for 24 hours before test. Epoxy-amine adducts were mixed with diluted resin using a speed mixer for 2 min at 1,500 rpm. Then the coating mixtures were applied on testing substrates and cured at 5° C. and 85% relative humidity in a climatic chamber.

Details of CTE and TE 1 through TE 13 are given in Tables 4 and 5.

Drying time, hardness development, and water spot resistance were measured accordingly.

TABLE 4

| | CTE | TE 1 | TE 2 | TE 3 | TE 4 | TE 5 | TE 6 |
|---|---|---|---|---|---|---|---|
| Stoichiometric ratio | — | 55.0 | 27.5 | 13.8 | 9.2 | 7.9 | 6.9 |
| Hardener use level (phr) | 50.1 | 52.8 | 55.6 | 61.6 | 68.0 | 71.4 | 75 |
| Viscosity 25° C. (mPa s) | 6,000 | 1,029 | 1,884 | 5,886 | 17,846 | 23,330 | 58,000 |
| Shore D Hardness | | | | | | | |
| 1 d | 58 | 65 | 69 | 71 | 73 | 69 | 21 |
| 2 d | 77 | 77 | 77 | 77 | 78 | 74 | 74 |
| 3 d | 78 | 78 | 78 | 78 | 79 | 76 | 75 |

TABLE 4-continued

| | CTE | TE 1 | TE 2 | TE 3 | TE 4 | TE 5 | TE 6 |
|---|---|---|---|---|---|---|---|
| 7 d | 78 | 79 | 79 | 79 | 80 | 76 | 75.5 |
| Water spot resistance | | | | | | | |
| 1 d | 1 | 1 | 1 | 4 | 5 | 4 | 3 |
| 2 d | 1 | 1 | 1 | 5 | 5 | 5 | 4 |
| Dry time | | | | | | | |
| Stage 1 | 2.7 | 2.6 | 2.8 | 2.7 | 1.3 | 2.5 | 2.5 |
| Stage 2 | 17 | 10 | 8 | 6.5 | 4.8 | 4.7 | 4 |
| Stage 3 | >24 | 20.5 | 17.5 | 18.1 | 14.2 | 6.2 | 5.9 |
| Stage 4 | >24 | >24 | >24 | >24 | >24 | 9 | 8.6 |

TABLE 5

| | TE 7 | TE 8 | TE 9 | TE 10 | TE 11 | TE 12 | TE 13 |
|---|---|---|---|---|---|---|---|
| Stoichiometric ratio | 53.5 | 26.8 | 13.4 | 8.9 | 6.7 | 5.9 | 5.4 |
| Hardener use level (phr) | 52.8 | 55.7 | 61.7 | 68.2 | 75.4 | 79.2 | 83.1 |
| Viscosity 25° C. (mPa s) | 738 | 880 | 1,357 | 1,947 | 3,170 | 4,457 | 4,920 |
| Shore D Hardness | | | | | | | |
| 1 d | 63 | 61 | 58 | 57 | 54 | 56 | 58 |
| 2 d | 79 | 79 | 78 | 78 | 78 | 72 | 73 |
| 3 d | 80 | 80 | 80 | 80 | 80 | 76 | 66 |
| 7 d | 78 | 79 | 78 | 78 | 78 | 77 | 76.5 |
| Water spot resistance | | | | | | | |
| 1 d | 1 | 1 | 1 | 3 | 4 | 5 | 5 |
| 2 d | 1 | 1 | 1 | 4 | 5 | 5 | 5 |
| Dry time | | | | | | | |
| Stage 1 | 4.3 | 3.0 | 5.5 | 4.7 | 4.0 | 6.6 | 4.5 |
| Stage 2 | 9.5 | 8.5 | 7.5 | 7.2 | 6.0 | 9.6 | 7 |
| Stage 3 | 17.7 | 17.7 | 12.0 | 11.8 | 9.0 | 12.6 | 10 |
| Stage 4 | >24 | >24 | >24 | 20.5 | 16.5 | 16.7 | 17.5 |

Synthesis examples TE 3, 4, 10, and 11 showed excellent results in terms of fast dry time, hardness development and water spot resistance at 5° C. These are desired properties for flooring coating application at wintertime.

Various aspects and embodiments are possible. Some of those aspects and embodiments are described herein. After reading this specification, skilled artisans will appreciate that those aspects and embodiments are only illustrative and do not limit the scope of the present disclosure. Embodiments may be in accordance with any one or more of the embodiments as listed below.

The above description is presented to enable a person skilled in the art to make and use the present disclosure and is provided in the context of an application and its requirements. Various modifications to the preferred embodiments will be apparent to those skilled in the art, and the generic principles defined herein might be applied to other embodiments and applications without departing from the spirit and scope of the present disclosure. Thus, the present disclosure is not intended to be limited to the embodiments shown but is to be accorded the widest scope consistent with the principles and features disclosed herein. In this regard, certain embodiments within the present disclosure might not show every benefit of the present disclosure, considered broadly.

The invention claimed is:

1. An epoxy-amine adduct comprising a reaction product of:

a) a heterocyclic amine comprising a reaction product of a polyethylene polyamine having 3 to 10 nitrogen atoms and an aldehyde having 1 to 8 carbon atoms; and b) at least one epoxide having one or more epoxy groups, wherein the heterocyclic amine has at least two nitrogen atoms in at least one ring, and the epoxide has no alkoxylate repeating units, and wherein the stoichiometric ratio as the ratio of the equivalent number of active amine hydrogens of the heterocyclic polyamine to the equivalent number of epoxy groups of the epoxides is in the range of 3 to 100.

2. The epoxy-amine adduct according to claim 1, wherein a stoichiometric ratio is in a range of 4 to 40, wherein the stoichiometric ratio is a ratio of an equivalent number of active amine hydrogens of the heterocyclic polyamine to an equivalent number of epoxy groups in the epoxides.

3. The epoxy-amine adduct according to claim 1, wherein the epoxide includes one or more monofunctional epoxides or multifunctional epoxides.

4. The epoxy-amine adduct according to claim 3, wherein the epoxide includes one or more monofunctional epoxides selected from the group of o-cresyl glycidyl ether, phenyl glycidyl ether, p-tert-butylphenyl glycidyl ether, n-butyl glycidyl ether, 2-ethyl hexyl glycidyl ether, or any alkyl C8 to C14 glycidyl ether.

5. The epoxy-amine adduct according to claim 3, wherein the epoxide includes one or more multifunctional epoxides selected from the group of bisphenol A diglycidyl ether, bisphenol E diglycidyl ether, bisphenol F diglycidyl ether, 1,4-butanediol diglycidyl ether, cyclohexane dimethylol diglycidyl ether, resorcinol diglycidyl ether, glycerol triglycidyl ether, trimethylol propane triglycidyl ether, or novalac epoxy resin.

6. The epoxy-amine adduct according to claim 1, wherein the heterocyclic amine comprises at least one amine represented as formula (I):

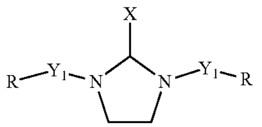
(I)

wherein X is independently selected from a hydrogen atom, a linear or branched $C_1$ to $C_4$ alkyl group, or a substituted or un-substituted phenyl group, $Y_1$ is a direct bond or a divalent polyethylene polyamine group having 1 to 8 nitrogen atoms, and R is independently a hydrogen atom or a group selected from $C_1$-$C_8$ alkyl, alkenyl, or alkaryl groups.

7. The epoxy-amine adduct according to claim 1, wherein the heterocyclic amine comprises at least one amine represented as formula (II):

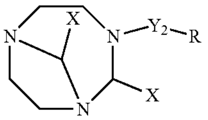
(II)

wherein X is independently selected from a hydrogen atom, a linear or branched $C_1$ to $C_4$ alkyl group, or a substituted or un-substituted phenyl group, wherein, Y2 is a direct bond or a divalent polyethylene polyamine group having 1 to 7 nitrogen atoms, and R is independently a hydrogen atom or a group selected from $C_1$-$C_8$ alkyl, alkenyl, or alkaryl groups.

8. The epoxy-amine adduct according to claim 1, wherein the heterocyclic amine comprises:

a) at least one amine represented as formula (III):

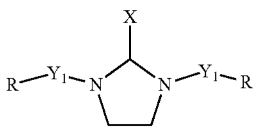
(I)

wherein X is independently selected from a hydrogen atom, a linear or branched $C_1$ to $C_4$ alkyl group, or a substituted or un-substituted phenyl group, $Y_1$ is a direct bond or a divalent polyethylene polyamine group having 1 to 8 nitrogen atoms, and R is independently a hydrogen atom or a group selected from $C_1$-$C_8$ alkyl, alkenyl, or alkaryl groups; and b) at least one amine represented as formula (IV)

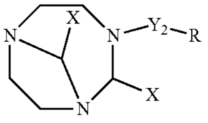
(II)

wherein X is independently selected from a hydrogen atom, a linear or branched $C_1$ to $C_4$ alkyl group, or a substituted or un-substituted phenyl group, wherein, Y2 is a direct bond or a divalent polyethylene polyamine group having 1 to 7 nitrogen atoms, and R is independently a hydrogen atom or a group selected from $C_1$-$C_8$alkyl, alkenyl, or alkaryl groups.

9. A curing agent comprising the epoxy-amine adduct according to claim 1 and a plasticizer.

10. The curing agent according to claim 9, further comprising one or more additives, wherein the one or more additives constitute a proportion of not greater than 30 wt. % with respect to a total weight of the curing composition.

11. The curing agent according to claim 9, further comprising one or more catalysts.

12. The curing agent according to claim 9, wherein the plasticizer comprises one or more selected from benzyl alcohol, n-butanol, xylene, methyl ethyl ketone, nonyl phenol, dodecyl phenol, cardanol, or an ester of phthalic acid.

13. The curing agent according to claim 10, wherein the one or more additives are selected from the group consisting of fillers, reinforcing agents, coupling agents, toughening agents, defoamers, dispersants, lubricants, colorants, marking materials, dyes, pigments, IR absorbers, antistats, antiblocking agents, nucleating agents, crystallization accelerators, crystallization delayers, conductivity additives, carbon black, graphite, carbon nanotubes, graphene, desiccants, de-molding agents, levelling auxiliaries, flame retardants, separating agents, optical lighteners, rheology additives, photochromic additives, softeners, adhesion promoters, antidripping agents, metallic pigments, stabilizers, metal glitters, metal coated particles, porosity inducers, glass fibers, nanoparticles, or flow assistants.

14. A method for preparing an epoxy-amine adduct according to claim 1, comprising:

heating a) a heterocyclic amine comprising a reaction product of a polyethylene polyamine having 3 to 10 nitrogen atoms and an aldehyde having 1 to 8 carbon atoms; and b) at least one epoxide having one or more epoxy groups, to a temperature of 120° C. to 280° C. for 0.5 to 10 hours; and wherein the heterocyclic amine has at least two nitrogen atoms in at least one ring, and the epoxide has no alkoxylate repeating units, and wherein the stoichiometric ratio as the ratio of the equivalent number of active amine hydrogens of the heterocyclic polyamine to the equivalent number of epoxy groups of the epoxides is in the range of 3 to 100.

15. The method according to claim 14, wherein a stoichiometric ratio of the epoxy resin to the heterocyclic amine is within a mole ratio of 4 to 40.

16. The epoxy-amine adduct according to claim 1, wherein a stoichiometric ratio is in a range of 5 to 15, wherein the stoichiometric ratio is a ratio of an equivalent number of active amine hydrogens of the heterocyclic polyamine to an equivalent number of epoxy groups in the epoxides.

* * * * *